United States Patent [19]

Bagshaw et al.

[11] Patent Number: 5,181,013
[45] Date of Patent: Jan. 19, 1993

[54] DISPLAY APPARATUS

[75] Inventors: John M. Bagshaw, Chelmsford; Donald C. Bowles, Tonbridge, both of United Kingdom

[73] Assignee: GEC-Marconi Limited, Middlesex, United Kingdom

[21] Appl. No.: 417,512

[22] Filed: Oct. 5, 1989

[51] Int. Cl.$^5$ ............................................. G09G 1/28
[52] U.S. Cl. ....................................... 340/702; 358/58; 358/59
[58] Field of Search .................. 340/701, 702, 795; 350/342, 358, 372, 174, 337; 358/58, 59, 88, 56, 60

[56] References Cited

U.S. PATENT DOCUMENTS

| | | | |
|---|---|---|---|
| 3,152,222 | 10/1964 | Loebner | 340/795 |
| 3,264,479 | 8/1966 | Peek | 340/795 |
| 3,655,265 | 4/1972 | Hammond | 359/308 |
| 3,700,912 | 10/1972 | Glass et al. | 350/373 |
| 3,732,429 | 5/1973 | Braunstein et al. | 350/342 |
| 3,764,211 | 10/1973 | Morse et al. | 350/342 |
| 3,778,548 | 12/1973 | Nistri | 350/174 |
| 3,787,713 | 11/1988 | Lu et al. | 350/342 |
| 3,982,817 | 9/1976 | Feichtner | 350/373 |
| 4,090,219 | 5/1978 | Ernstoff et al. | 358/59 |
| 4,295,159 | 10/1981 | Carollo et al. | 358/22 |
| 4,647,966 | 3/1987 | Phillips et al. | 358/88 |

FOREIGN PATENT DOCUMENTS 114553 1/1984 European Pat. Off.

*Primary Examiner*—Ulysses Weldon
*Assistant Examiner*—Matthew Luu
*Attorney, Agent, or Firm*—Spencer, Frank & Schneider

[57] ABSTRACT

A cathode ray tube is used to address a spatial light modulator. The light used to read the spatial light modulator is preferably passed through an acoustic optical tunable filter to enable the wavelength and intensity to be rapidly controlled to provide, for example, a multicolor display of variable intensity. This finds particular application in head-up displays for use by pilots of aircrafts.

16 Claims, 2 Drawing Sheets

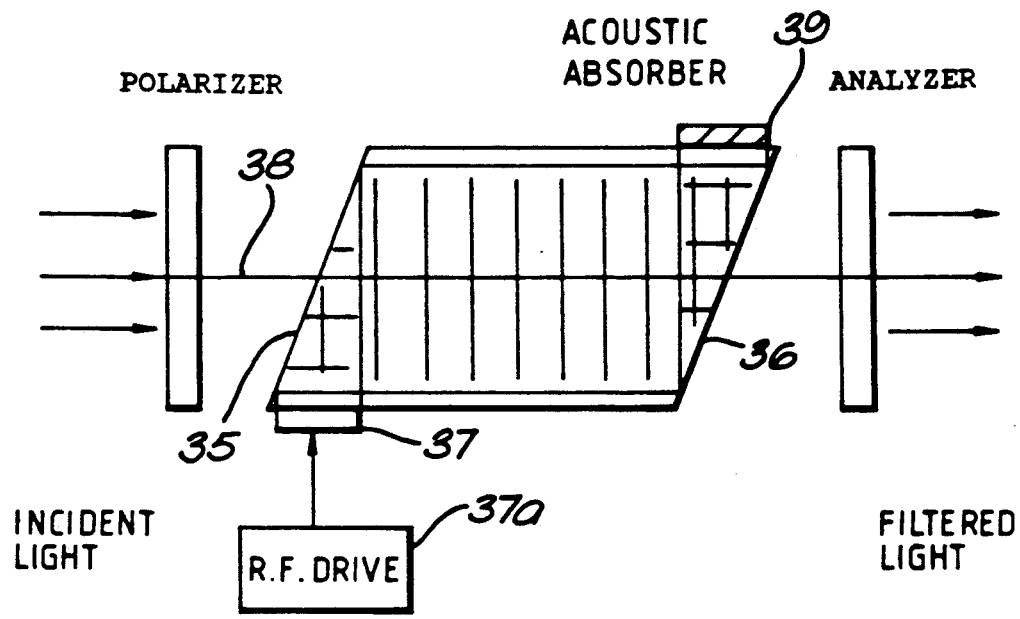
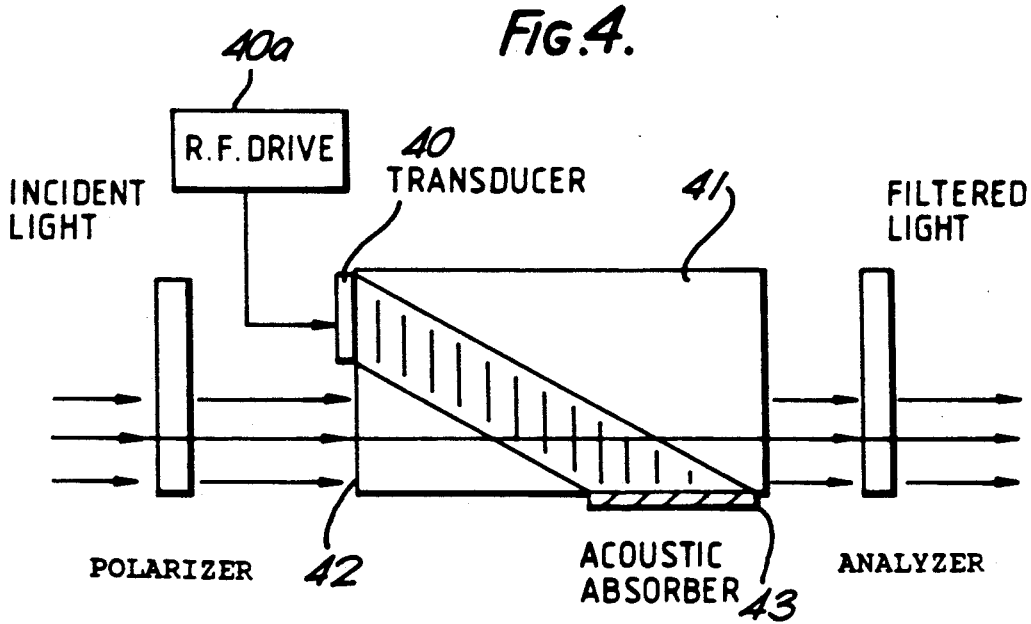

DISPLAY APPARATUS

FIELD OF THE INVENTION

This invention relates to a display apparatus, usable, for example, in producing an aircraft pilot's head-up display.

DESCRIPTION OF THE PRIOR ART

Conventional head-up displays use a cathode ray tube to generate an image which is projected into the pilot's line of sight in such a manner that the displayed information is in focus when the pilot is focusing on the scene forward of the aircraft, i.e. at infinity. Typically the information is displayed in numeric form.

A problem with the use of cathode ray tubes in head-up display apparatus is that of obtaining sufficient brightness. In daylight conditions, the information must be visible against a very bright background, for example of sky, but it must also be variable to provide lower brightness levels under cloudy conditions or at night. To achieve maximum brightness, the cathode ray tube must be run at maximum output, but the resultant higher current of electrons striking the phospor screen results in the beam having an undesirably large diameter, resulting in decreased sharpness of the image.

It is also desirable in a head-up display to have different types of information displayed in different colors to assist the pilot in selecting the information relevant to the particular circumstances in which he is flying. Color displays can be obtained in a number of different known ways. For example, a multi-gun shadow mask cathode ray tube may be employed. Alternative methods employ a penetration phosphor cathode ray tube, a mixed phosphor cathode ray tube with a liquid crystal color shutter, or multiple cathode ray tubes with optical image mixing. Each of these methods has limitations in its application to head-up displays, for example in relative brightness of different colors in the display, in the number of different colors which can be displayed, or in accurate registration of the different colored parts of the display.

BRIEF SUMMARY OF THE INVENTION

The present invention provides a display apparatus comprising a spatial light modulator having a photosensitive input surface and an output surface, the input surface being arranged to vary the light reflectance characteristics of the output surface according to an image formed on the input surface, a cathode ray tube having a phosphor screen coupled to the input surface of the spatial light modulator, whereby successive frames of an image formed by the cathode ray tube onto the screen are each reproduced as a reflectance pattern at the output surface; and a light source operable to irradiate the output surface with light of a variable wavelength and/or variable intensity each selected cyclically in synchronism with and in accordance with each frame of the image formed by the cathode ray tube.

The light source preferably includes a tunable optical filter in the light path, and control means to apply a control signal to the filter, whereby the wavelength and/or intensity of the light emerging from the filter may be varied according to the instant set of control variables. The tunable optical filter is preferably an acousto-optic tunable filter in which both the wavelength and the intensity of the light source can readily be controlled by appropriate drive signals.

The invention further provides a display apparatus which comprises means for developing at an output surface successive frames of a light reflectance pattern which varies according to successive sets of control variables, and a light source operable to irradiate the surface with light of a wavelength and/or intensity selected cyclically in synchronism with each frame produced by the means for producing the reflectance pattern according to said successive sets of control variables, wherein the light source comprises a tunable filter in the light path, and control means to apply a control signal to the filter, whereby the wavelength and/or intensity of the light emerging from the filter may be varied according to the instant set of control variables.

Using apparatus according to the invention in a head-up display, an image of high, but widely and continously variable, brightness, and incorporating a wide range of colors, may be produced.

BRIEF DESCRIPTION OF THE DRAWINGS

FIGS. 3 and 4 show different exemplary embodiments of the acousto-optic tunable filter usable in the device of the invention.

DETAILED DESCRIPTION OF THE PREFERRED EMBODIMENTS

Figure 1:
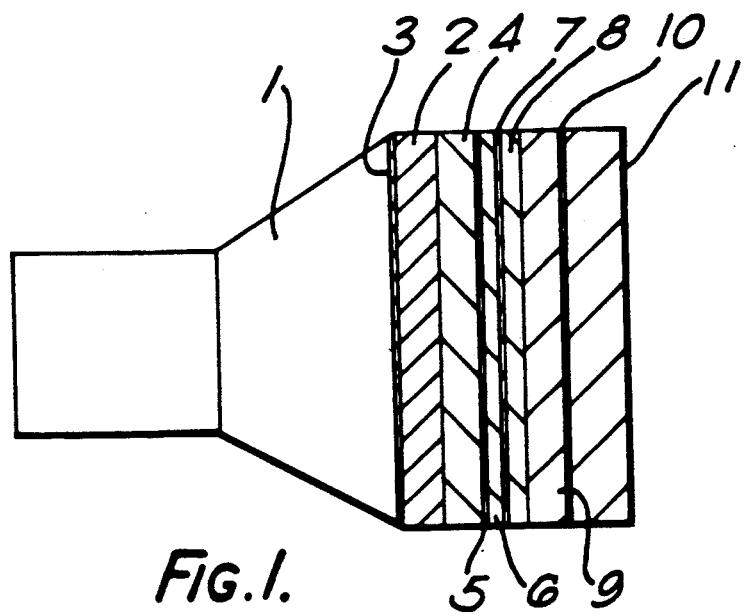
FIG. 1 is a diagrammatic sectional view of a display device in accordance with the invention.

Referring to FIG. 1, the device comprises a high resolution cathode ray tube 1 of generally conventional construction and therefore only shown schematically in FIG. 1. The tube 1 has a fiber optic face plate 2 in contact with the phosphor layer 3. The face plate 2 is coupled to a second fibre optic face plate 4 on the rear face of which is provided a thin layer 5 of indium tin oxide (ITO) serving as a transparent electrode. A layer 6 of amorphous silicon having a thickness between 0.25 and 5 $\mu$m overlies the electrode layer 5, serving as a high resistivity photoconductive layer. On this layer is deposited a light-blocking layer 7 which is also overlaid with a high efficiency dielectric mirror 8. The mirror 8 reflects about 99.9% of the reading light to give a low insertion loss, while the light blocking layer 7, which may be a layer incorporating an absorbing dye, absorbs the remaining 0.1% of the read light which passes through the mirror and prevents it from falling onto the photoconductor, which would reduce the contrast of the image. A high uniformity liquid crystal cell 9 is then positioned against the dielectric mirror 8, and a further transparent electrode 10 is formed on the face of the liquid crystal cell 9, for example using ITO. Finally, a glass face plate 11 overlies the electrode 10.

If a DC, or preferably an AC, voltage is applied across the electrodes 5 and 10, any areas of the photoconductor 6 that are not illuminated by those portions of the phosphor screen 3 where the electron beam of the cathode ray tube 1 impinges have a very high impedance, and little voltage is transferred to the liquid crystal, which remains deactivated. Thus, no read light is transferred to the image output plane. Where the photoconductor 6 is illuminated, there is a net voltage transferred to the liquid crystal layer. The voltage applied is divided between the photoconductor 6 and the liquid crystal cell 9 in series. Accordingly, the resistivity of the photoconductor 6 controls the voltage across the cell 9. This allows the read light to be modulated by the cell 9 and so form an image at the output image plane. It should be noted that the photoconductor 6 is made sufficiently thin that the sideways diffusion of charge is minimized. This allows adjacent areas of the device to be simultaneously on and off, so that details in the input image in the cathode ray tube are not blurred in the output image. Additionally, the voltage transferred to the liquid crystal is proportional to the intensity of the incident light, which gives the device a full grey scale ability.

Figure 2:
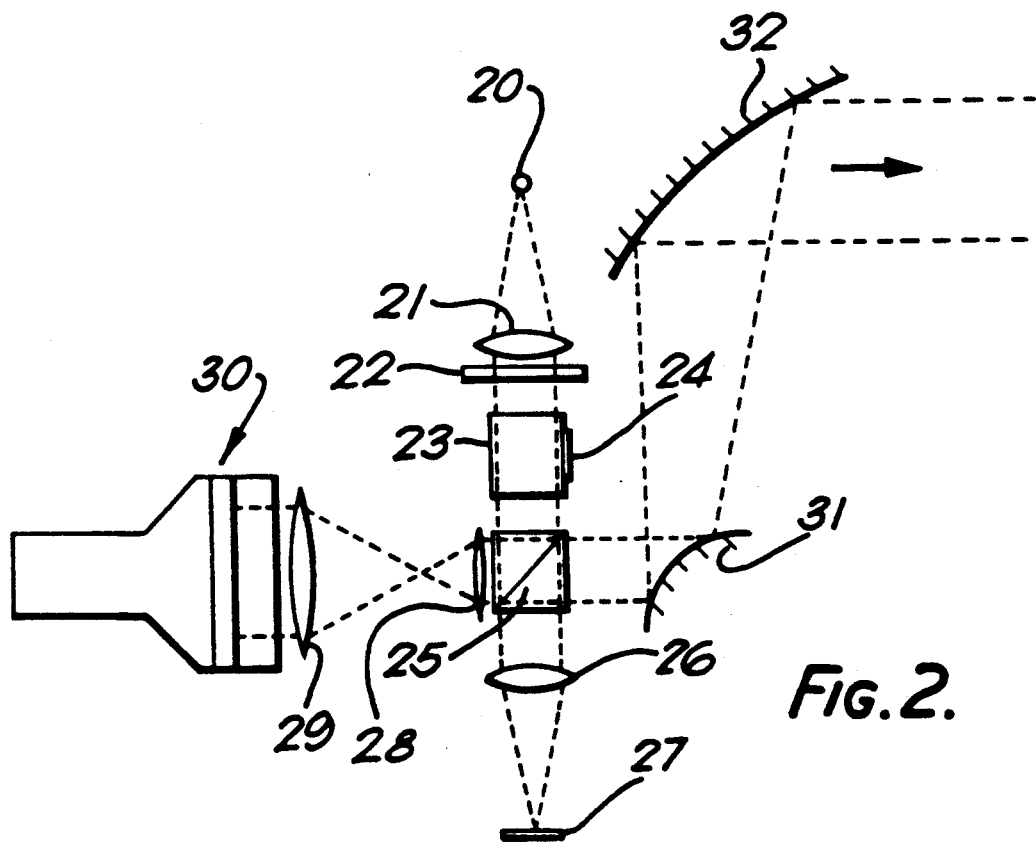
FIG. 2 illustrates the use of the display device of FIG. 1 in a head-up display.

An application of the device shown in FIG. 1 in a head-up display for the pilot of an aircraft, for example, is illustrated in FIG. 2. The head-up display arrangement comprises a compact source 20 of intense white light, suitably a Xenon arc metal halide lamp or quartz halogen lamp. Light from the source 20 passes through a condensing lens 21 and then through a polarizer 22 to produce plane polarized light. The polarized light then passes through an acousto-optic tunable filter 23 consisting of a piece of acousto-optic material, which may be tellurium dioxide or lithium niobate, to which is bonded a piezo electric transducer 24. The transducer 24 converts an applied r.f. signal into an acoustic wave which propagates through the acousto-optic medium and appears optically as a moving diffraction grating. This diffraction grating may be used to wavelength filter the incident light. The acousto-optic interaction involves a phase matching process in which the acoustic wave vector is summed with the incident optical wave vector to give the diffracted optical wave vector. For any optical input wave vector (i.e. optical wavelengths) phase matching is only achieved by a particular acoustic wave vector (i.e. acoustic frequency). A particular optical wavelength is therefore diffracted and hence filtered by a particular acoustic frequency. In a conventional orthogonal acousto-optic tunable filter, filtering is achieved by both polarization and angular separation of the diffracted and undiffracted beams. If necessary, however, the diffracted and undiffracted beams may be made parallel by wedging of the output face of the filter. For a collinear filter, filtering is achieved by polarization separation; the diffracted and undiffracted beams travel in the same direction. In either configuration, the diffracted beam is polarization switched, so that operating the device between crossed polarizers gives a tunable filter. The optical wavelength diffracted depends on the input acoustic frequency, while the intensity of the diffracted beam depends on input acoustic power.

Light emerging from the filter 23 enters a polarizing beam splitter 25 which allows light unchanged in its polarization in passage through the filter 23 to pass straight through. This unfiltered light is focused by a lens 26 onto an absorbent beam dump surface 27.

The light whose polarization has been changed in the filter 23, and is therefore the light of the desired wavelength and intensity, is reflected by the beam splitter through lenses 28 and 29 onto the output surface of the spatial light modulator/cathode ray tube combination 30. The liquid crystal has the effect of rotating the polarization of the light only where its state has been altered by the presence of an electric field, which in turn corresponds to the desired image pattern. The reflected light passes back to the beam splitter 25 which allows the passage only of light whose polarization has been changed by the liquid crystal, i.e. light forming part of the desired image. The light passes onto a first focusing reflector 31 which directs the light onto a semi-reflective surface 32 in the line of sight of the pilot. The surface 32 is also curved, the combined effect of the mirrors 31 and 32 being to make the image projected appear to come from infinity. The polarization of the light impinging upon the semi-reflective curved mirror 32 is such as to give an optimized reflection at that surface, ensuring that the pilot sees the brightest possible image. It will be appreciated that the focusing reflectors (spherical mirrors) 31, 32 may be replaced by planar mirrors used in conjunction with focusing lenses.

The scanning of the cathode ray tube and the modulation of the acousto-optic tunable filter are controlled together so that each frame of information projected is displayed in the appropriate color and intensity. The color, and if necessary intensity of the light emerging from the filter 23 may, if desired, be changed for each successive frame in a predetermined sequence, so that the resultant image contains a plurality of elements of widely differing colors and, if necessary, intensities. The frame rate will be adjusted, as appropriate, to ensure that a flicker-free multi-color image is obtained. The wavelength range of operation is controlled by the acousto-optic tunable filter. Typically, the filter could operate over an optical bandwidth of 0.9 of an octave (e.g. 440 nm to 800 nm), with up to 100 separate resolvable wavelengths. If desired, the head-up display can therefore be arranged to operate at a longer, infra-red, wavelength at night, so that the visibility of the aircraft is not increased by visible light from the head-up display. The pilot would be able to read the display by the use of a night-vision device sensitive to infra-red wavelengths. Should the light source become defective, or develop a flicker, the response time of the tunable filter (10 $\mu$s) is so fast that it is possible to configure the system so that rapid intensity variations can be removed.

The acousto-optic tunable filter described with reference to FIG. 2 is orthogonal. However, acousto-optic tunable filters may also operate in a collinear mode. The collinear mode may have some advantages in this application in that it intrinsically has a larger field of view and it should be possible using a collinear filter to make the head-up display apparatus more compact. In collinear acousto-optic tunable filters, the optical and acoustic wave vector directions are the same, and it is necessary to get the acoustic and optical wave vectors to travel in the same direction. Ideally, this would be achieved by having an optically transparent acoustic transducer. However, at present this represents severe technical problems, mainly due to the difficulty of achieving low loss electro-acoustic transduction (which requires very good electrical conductors), with low optical loss.

Two approaches which may be adopted in the present invention are shown in FIGS. 3 and 4. FIG. 3 shows a collinear filter in which the acoustic wave is generated in a direction at an angle to that required and is reflected off a crystal surface to travel in the direction required for the collinear interaction. Thus, the filter has oblique end faces 35 and 36 with the r.f. transducer 37 directed orthogonally to the optical axis 38. The acoustic waves produced by the transducer 37, driven by an r.f. drive circuit 37a, reflect from the end face 35 and pass along the filter collinearly with the optical waves. At the opposite end face 36, the optical waves emerge, while the acoustic waves are reflected, again orthogonally to the optical axis, into an acoustic absorber 39.

In an alternative approach, the collinear filter shown in FIG. 4 is fabricated from the material in which there is an appreciable amount of acoustic walk-off. (Acoustic walk-off occurs in acoustically anisotropic media such as crystals. The acoustic power flow direction is at an angle to the acoustic wave vector direction, and the acoustic beam propagates at an angle to the direction at which it is launched into the material). The device is designed in such a way that the optical beam interacts with the acoustic beam after it has cleared the geometrical shadow of the transducer. The transducer 40, driven by an r.f. drive circuit 40a, is located on an end face of the crystalline material 41 to one side of the portion 42 where the polarized incident light enters. An acoustic absorber 43 is provided on the side wall of the material 41 diagonally opposite the transducer 40 the light interacts with the acoustic wave travelling between the transducer and the absorber. The usefulness of this approach is somewhat limited by the need to use a material with a high acoustic walk off angle.

Although the invention has been particularly described with reference to head-up displays in aircraft, the device of the invention will have other applications, for example head-down displays, and high brightness projected television; and in color mixing for printing processes.

We claim:

1. A display apparatus comprising a spatial light modulator having a photosensitive input surface and an output surface, the input surface being arranged to vary the light reflectance characteristics of the output surface according to an image formed on the input surface, a cathode ray tube having a phosphor screen, the phosphor screen being coupled to the input surface of the spatial light modulator, whereby successive frames of an image formed by the cathode ray tube onto said screen are each reproduced as a reflectance pattern at the output surface; and a light source operable to irradiate the output surface with light of a variable wavelength and/or variable intensity each selected cyclically in synchronism with and in accordance with each frame of the image formed by the cathode ray tube.

2. An apparatus according to claim 1, wherein the phosphor screen of the cathode ray tube is coupled to the spatial light modulator by at least one fiber optic plate.

3. An apparatus according to claim 1, wherein the photosensitive input surface comprises a photoconductive layer.

4. An apparatus according to claim 3, wherein the photoconductive layer is of amorphous silicon.

5. An apparatus to claim 4 wherein the amorphous silicon layer has a thickness of 0.25 to 5 $\mu$m.

6. An apparatus according to claim 1, wherein the output surface comprises a liquid crystal cell.

7. An apparatus according to claim 6, wherein the output surface also comprises a dielectric mirror.

8. An apparatus according to claim 7, wherein a light blocking layer is interposed between the input surface and the dielectric mirror.

9. An apparatus according to claim 8, wherein the light blocking layer comprises a dye.

10. An apparatus according to claim 1, comprising focusing means for focusing the light reflected from the output surface to enable the image formed thereat to be viewed.

11. An apparatus according to claim 1, wherein the light source comprises a tunable filter in the light path, and control means to apply a control signal to the filter, whereby the wavelength and/or intensity of the light emerging from the filter may be varied according to the instant set of control variables.

12. An apparatus according to claim 11, wherein the tunable filter is an acousto-optic filter.

13. An apparatus according to claim 12, wherein the acousto-optic tunable filter is arranged to operate in a collinear mode.

14. An apparatus according to claim 12, wherein the acousto-optic tunable filter comprises a body of tellurium dioxide, lithium niobate, or lead molybdate, as the acousto-optic medium.

15. An apparatus according to claim 1, wherein the photosensitive input surface comprises a silicon microdiode array.

16. An aircraft head-up display, comprising a display apparatus according to claim 1 in combination with means for reflecting and focussing light reflected from said output surface into the line of sight of the aircraft pilot in such a manner that the reflected light is seen by the pilot superimposed on his direct visual field of view.

* * * * *